(12) United States Patent
Wittkopp

(10) Patent No.: US 7,464,801 B2
(45) Date of Patent: Dec. 16, 2008

(54) SELECTABLE ONE-WAY CLUTCH

(75) Inventor: Scott H. Wittkopp, Ypsilanti, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 384 days.

(21) Appl. No.: 11/333,087

(22) Filed: Jan. 17, 2006

(65) Prior Publication Data

US 2007/0163853 A1    Jul. 19, 2007

(51) Int. Cl.
    *F16D 15/00* (2006.01)
(52) U.S. Cl. ........................................ 192/44
(58) Field of Classification Search ............. 192/44, 192/47
    See application file for complete search history.

(56) References Cited

U.S. PATENT DOCUMENTS

| | | | | |
|---|---|---|---|---|
| 247,669 A | * | 9/1881 | Mallet et al. .................... | 81/33 |
| 1,963,660 A | * | 6/1934 | Greninger ................ | 192/13 R |
| 2,001,668 A | * | 5/1935 | Maier .......................... | 192/44 |
| 2,629,469 A | * | 2/1953 | Dayton ..................... | 192/12 B |
| 3,054,488 A | * | 9/1962 | General et al. ................ | 192/44 |
| 3,084,774 A | * | 4/1963 | Liang .......................... | 192/44 |
| 3,134,471 A | * | 5/1964 | Croswhite .................... | 192/44 |
| 3,238,814 A | * | 3/1966 | Jandasek ..................... | 74/718 |
| 4,253,554 A | | 3/1981 | Nisenson .................. | 192/223.2 |
| 5,050,457 A | * | 9/1991 | Takayama et al. ............. | 474/70 |
| 5,967,277 A | | 10/1999 | Walter ........................ | 192/43.1 |
| 5,992,592 A | | 11/1999 | Showalter ................... | 192/43.1 |
| 6,176,359 B1 | | 1/2001 | Krisher ....................... | 192/43.1 |
| 6,244,965 B1 | | 6/2001 | Klecker et al. ................ | 464/81 |
| 2005/0072646 A1 | * | 4/2005 | Hamasaki et al. ............. | 192/44 |

FOREIGN PATENT DOCUMENTS

| | | | |
|---|---|---|---|
| JP | 57-79334 | * | 5/1982 |
| JP | 64-69829 | * | 3/1989 |
| JP | 2-138522 | * | 5/1990 |
| JP | 5-126170 | * | 5/1993 |
| WO | 9308410 | * | 4/1993 |

* cited by examiner

*Primary Examiner*—Sherry Estremsky

(57) ABSTRACT

The present invention provides a selectable one-way clutch including a generally annular race and a generally annular cam disposed radially about the race. The cam has a radially internal surface defining a first plurality of tapered face portions and a second plurality of tapered face portions. A first plurality of rollers are disposed radially between the race and the cam. A second plurality of rollers are disposed radially between the race and the cam, and are interposed between the first plurality of rollers. The first plurality of rollers are selectively engageable with the first plurality of tapered face portions to lock-up the selectable one-way clutch in a first direction, and the second plurality of rollers are selectively engageable with the second plurality of tapered face portions to lock-up the selectable one-way clutch in a second direction.

17 Claims, 2 Drawing Sheets

SELECTABLE ONE-WAY CLUTCH

TECHNICAL FIELD

The present invention is drawn to a selectable one-way clutch with two sets of rollers.

BACKGROUND OF THE INVENTION

Automatic transmissions generally effect a ratio change by altering the power delivery path after selective actuation of one or more friction elements. The fiction elements may include a one-way clutch configured to selectively transfer torque in a first direction, and to interrupt the transfer of torque in the opposite direction. As an example, a one-way clutch may be implemented to transfer torque from an engine to the transmission, and to interrupt the transfer of reverse torque from the transmission to the engine.

SUMMARY OF THE INVENTION

The selectable one-way clutch of the present invention includes a generally annular race and a generally annular cam disposed radially about the race. The cam has a radially internal surface defining a first plurality of tapered face portions, a second plurality of tapered face portions, and a plurality of shoulder portions. A first plurality of rollers are disposed radially between the race and the cam. A second plurality of rollers are disposed radially between the race and the cam, and are interposed respectively between the first plurality of rollers.

The first plurality of rollers are selectively engageable with the first plurality of tapered face portions to lock-up said selectable one-way clutch in a first direction, and the second plurality of rollers are selectively engageable with the second plurality of tapered face portions to lock-up the selectable one-way clutch in a second direction. The selectable one-way clutch also preferably includes an actuator selectively engageable with the first plurality of rollers such that the selectable one-way clutch overruns in the first direction, and selectively engageable with the second plurality of rollers such that the selectable one-way clutch overruns in the second direction.

According to one aspect of the invention, the actuator includes a plurality of fingers adapted to selectively engage the first plurality of rollers and the second plurality of rollers.

According to another aspect of the invention, the actuator is hydraulically controlled.

According to a further aspect of the invention, the selectable one-way clutch includes a plurality of springs disposed respectively between the first plurality of rollers and the second plurality of rollers such that the springs respectively bias the first plurality of rollers into engagement with the first plurality of tapered face portions, and the second plurality of rollers into engagement with the second plurality of tapered face portions.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
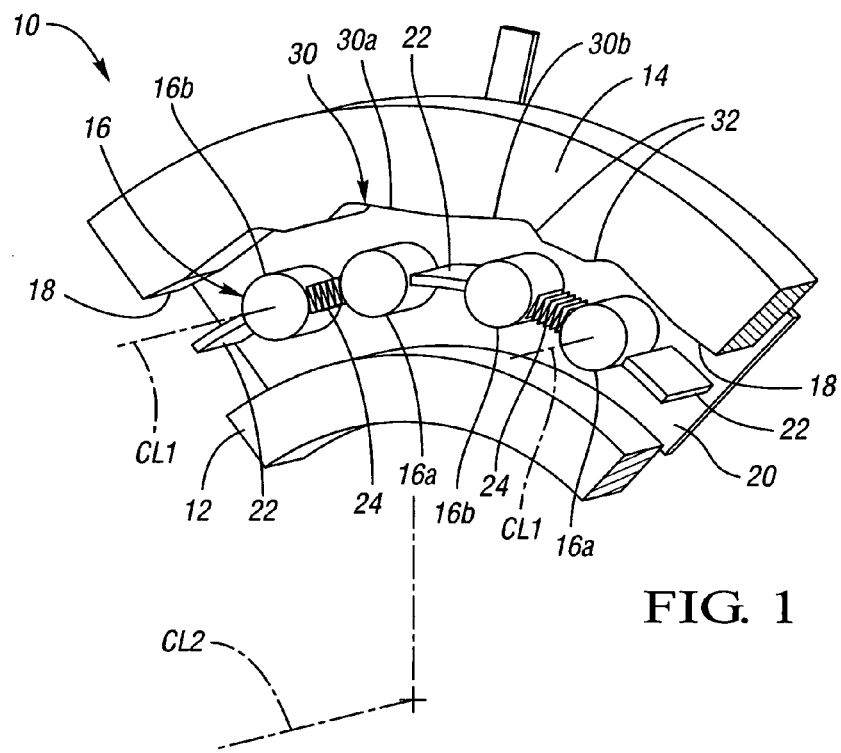
FIG. 1 is a partial isometric cut-away view of a selectable one-way clutch in accordance with the present invention.

Referring to the drawings wherein like reference numbers refer to like components, FIG. 1 shows a partial isometric cut-away view of a selectable one-way clutch or SOWC 10. The SOWC 10 includes a generally annular race 12 and a generally annular cam 14 circumscribing the race 12. A plurality of rollers 16 are disposed radially between the race 12 and the cam 14. A generally annular actuator cage 20 includes a plurality of fingers 22 thereabout configured to selectively translate one or more of the rollers 16 out of engagement with the cam 14 as will be described in detail hereinafter. A plurality of springs 24 keep one or more of the rollers 16 in near contact with the cam 14 while the SOWC 10 is overrunning so that the rollers 16 are set to carry torque when rotation is reversed. The term "lock-up" as used herein refers to the condition wherein torque is transferable through the SOWC 10, and the terms "free-wheel" and "overrun" refer to the condition wherein torque is not transferable through the SOWC 10.

The cam 14 preferably defines a plurality of tapered face portions 30 on a radially internal surface 18. The tapered face portions 30 generally taper radially inward toward the race 12. The tapered face portions 30 are configured to wedge a roller 16 between the cam 14 and the race 12 to lock-up the SOWC 10 as will be described in detail hereinafter. The tapered face portions 30 include a first plurality of face portions 30a to facilitate the lock-up of the SOWC 10 in a clockwise direction, and a second plurality of face portions 30b to facilitate the lock-up of the SOWC 10 in a counter-clockwise direction. The cam 14 also preferably defines a plurality of shoulder portions or hooks 32 on the radially internal surface 18. The shoulder portions 32 are configured to limit the translation of a respective roller 16 relative to the cam 14.

The rollers 16 include a first plurality of rollers 16a to facilitate the lock-up of the SOWC 10 in a clockwise direction, and a second plurality of rollers 16b to facilitate the lock-up of the SOWC 10 in a counter-clockwise direction. The rollers 16b are interposed respectively between the rollers 16a. According to a preferred embodiment the rollers 16a and 16b are generally cylindrical; however alternate configurations such as, for example, spherical rollers may be envisioned. The rollers 16a and 16b can each rotate about their own respective centerlines CL1 and/or revolve about a centerline CL2 defined by the race 12.

The SOWC 10 is configured to lock-up and transfer torque from the race 12 (drive member) to the cam 14 (driven member) in a first direction of rotation (i.e., either clockwise or counter-clockwise), and to free-wheel in the opposite direction of rotation. The SOWC 10 can potentially carry torque in either direction or overrun in either direction depending on its selection state. Additionally, the SOWC 10 may be controlled to lock-up and transfer torque in both the clockwise and counter-clockwise directions.

Figure 2:
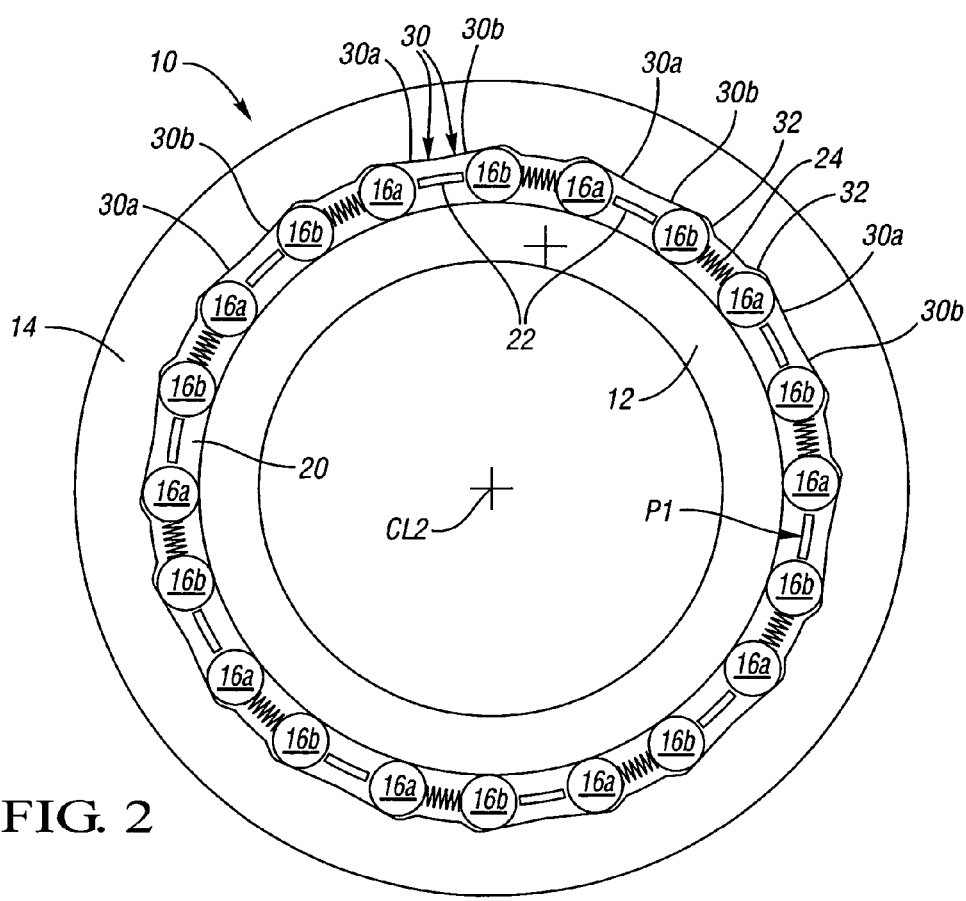
FIG. 2 is a side view of the selectable one-way clutch of FIG. 1 in a first selectable position.

The actuator cage 20 is preferably hydraulically actuated to one of three positions P1, P2 or P3. When the actuator cage 20 is in the first position P1 shown in FIG. 2, the SOWC 10 transfers torque from the race 12 to the cam 14 in both the clockwise and counter-clockwise directions. In position P1, the actuator cage fingers 22 do not engage either the rollers 16a or the rollers 16b. In the absence of an applied force from the actuator cage fingers 22 the rollers 16a each engage a respective face portion 30a, and the rollers 16b each engage a respective face portion 30b.

The transmission of torque in the clockwise direction while the actuator cage 20 is in the first position P1 is accomplished in the following manner. The rotation of the race 12 in a clockwise direction tends to rotate the rollers 16a about their respective centerlines CL1 (shown in FIG. 1) in a counter-clockwise direction, and about centerline CL2 in a clockwise direction such that the rollers 16a are translated along a respective face portion 30a of the cam 14. As the rollers 16a are translated along a respective face portion 30a, the radially inward taper of the face portions 30a wedge the rollers 16a between the race 12 and the cam 14 such that that a rigid connection is formed between the race 12, the rollers 16a, and the cam 14 and these components rotate as a single unit. In other words, the taper of the face portions 30a translates the clockwise revolution of the rollers 16a into a first component F1 pushing the rollers 16a radially inward toward the race 12, and a second component F2 revolving the rollers 16a about the centerline CL2 in a clockwise direction. For purposes of the present invention, the term "wedge" refers to the condition wherein the first component F1 is sufficient to push the rollers 16a against the race 12 such that the rollers 16a are prevented from rotating about their respective centerlines CL1 (shown in FIG. 1), and the second component F2 pushes the rollers 16a against a respective face portion 30a such that the rollers 16a rotate as a unit along with the cam 14 about the centerline CL2. Therefore, when the rollers 16a are wedged, torque is transmittable in a clockwise direction from the race 12, through the rollers 16a, and to the cam 14.

The transmission of torque in the counter-clockwise direction while the actuator cage 20 is in the first position P1 is accomplished in the following manner. The rotation of the race 12 (drive member) in a counter-clockwise direction tends to rotate the rollers 16b about their respective centerlines CL1 (shown in FIG. 1) in a clockwise direction, and about centerline CL2 in a counter-clockwise direction such that the rollers 16b are translated along a respective face portion 30b of the cam 14 (driven member). As the rollers 16b are translated along a respective face portion 30b, the radially inward taper of the face portions 30b wedge the rollers 16b between the race 12 and the cam 14 such that that a rigid connection is formed between the race 12, the rollers 16b, and the cam 14 and these components rotate as a single unit about centerline C2. Therefore, when the rollers 16b are wedged, torque is transmittable in a counter-clockwise direction from the driving race 12, through the rollers 16b, and to the driven cam 14.

Figure 3:
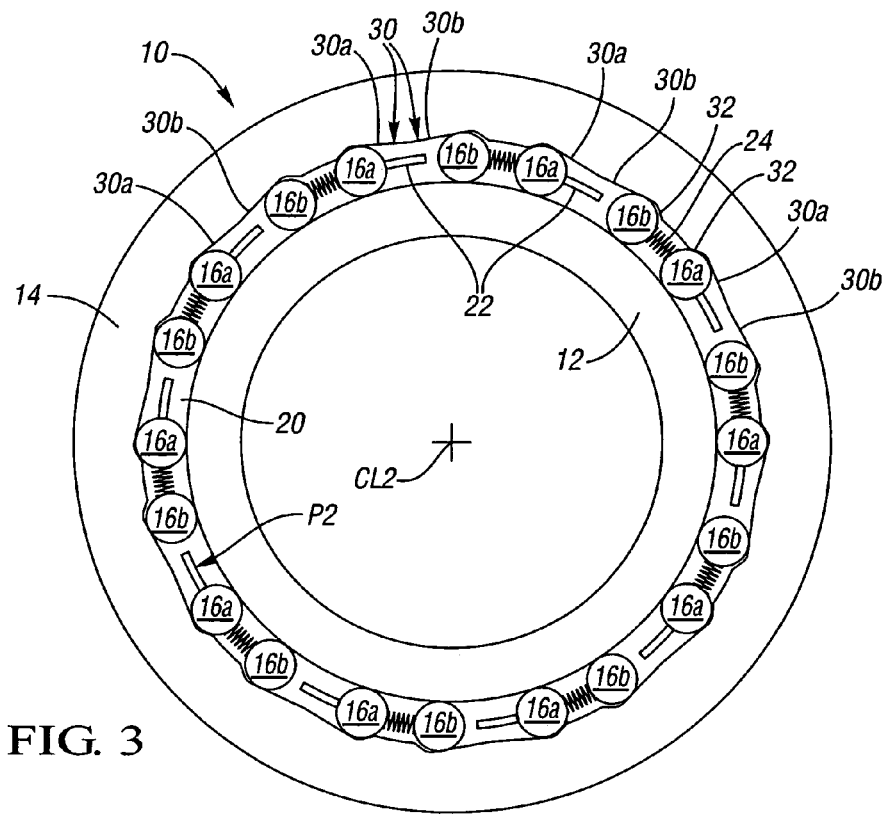
FIG. 3 is a side view of the selectable one-way clutch of FIG. 1 in a second selectable position.

When the actuator cage 20 is in the second position P2 shown in FIG. 3, the SOWC 10 transfers torque from the race 12 to the cam 14 when the race 12 is rotated in a counter-clockwise direction, and the SOWC 10 freewheels when the race 12 is rotated in a clockwise direction. In position P2, the actuator cage fingers 22 push the rollers 16a in a counter-clockwise direction and out of engagement with the face portions 30a. As the actuator cage fingers 22 do not engage the rollers 16b, the rollers 16b remain in contact with respective face portions 30b. Additionally, the springs 24 push the rollers 16b into engagement with the face portions 30b so that the rollers 16b are set to carry torque in the counter-clockwise direction.

The SOWC 10 transmits torque in the counter-clockwise direction while the actuator cage 20 is in the second position P2 in the following manner. When the actuator cage 20 is in the second position P2, the rotation of the race 12 in a counter-clockwise direction revolves the rollers 16b about the centerline CL2 into engagement with a respective face portion 30b, and the radially inward taper of the face portions 30b wedge the rollers 16b between the race 12 and the cam 14. Therefore, when the rollers 16b are wedged, torque is transmittable in a counter-clockwise direction from the driving race 12, through the rollers 16b, and to the driven cam 14.

The SOWC 10 freewheels and thereby interrupts the transmission of torque in the clockwise direction while the actuator cage 20 is in the second position P2 in the following manner. As the actuator cage fingers 22 push the rollers 16a out of engagement with the face portions 30a, the rollers 16a do not get wedged and are free to rotate about their respective centerlines CL1 (shown in FIG. 1) without transferring torque to the cam 14. Therefore, when the rollers 16a are not wedged, torque is transmittable in a clockwise direction from the race 12 to the rollers 16a thereby causing the rollers 16a to spin about their respective centerlines CL1 such that torque is not transmitted to the cam 14 and the SOWC 10 freewheels.

Figure 4:
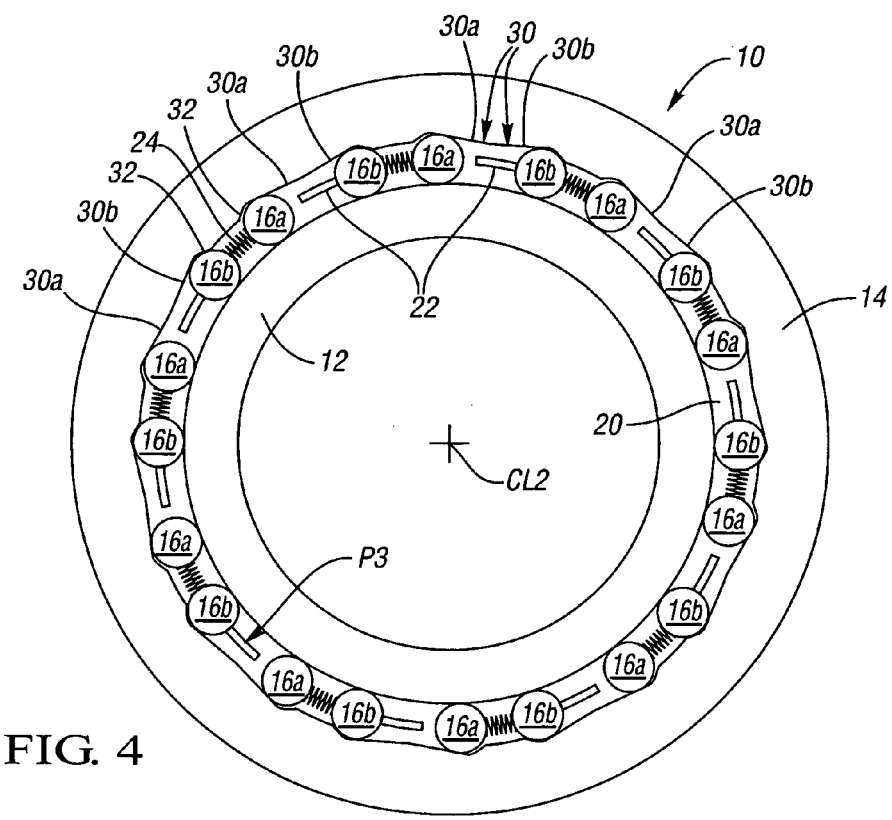
FIG. 4 is a side view of the selectable one-way clutch of FIG. 1 in a third selectable position.

When the actuator cage 20 is in the third position P3 shown in FIG. 4, the SOWC 10 transfers torque from the driving race 12 to the driven cam 14 when the race 12 is rotated in a clockwise direction, and the SOWC 10 freewheels when the race 12 is rotated in a counter-clockwise direction. In position P3, the actuator cage fingers 22 push the rollers 16b in a clockwise direction and out of engagement with the face portions 30b. As the actuator cage fingers 22 do not engage the rollers 16a, the rollers 16a remain in contact with respective face portions 30a. Additionally, the springs 24 push the rollers 16a into engagement with the face portions 30a so that the rollers 16a are set to carry torque in the clockwise direction.

The SOWC 10 transmits torque in the clockwise direction while the actuator cage 20 is in the third position P3 in the following manner. When the actuator cage 20 is in the third position P3, rotation of the race 12 in a clockwise direction revolves the rollers 16a about the centerline CL2 into engagement with a respective face portion 30a, and the radially inward taper of the face portions 30a wedge the rollers 16a between the race 12 and the cam 14. Therefore, when the rollers 16a are wedged, torque is transmittable in a clockwise direction from the driving race 12, through the rollers 16a, and to the driven cam 14.

The SOWC 10 freewheels and thereby interrupts the transmission of torque in the counter-clockwise direction while the actuator cage 20 is in the third position P3 in the following manner. As the actuator cage fingers 22 push the rollers 16b out of engagement with the face portions 30b, the rollers 16b do not get wedged and are free to rotate about their respective centerlines CL1 (shown in FIG. 1) without transferring torque to the cam 14. Therefore, when the rollers 16b are not wedged, torque is transmittable in a clockwise direction from the race 12 to the rollers 16b thereby causing the rollers 16b to spin about their respective centerlines CL1 such that none of the torque is transmitted to the cam 14 and the SOWC 10 freewheels.

While the best modes for carrying out the invention have been described in detail, those familiar with the art to which this invention relates will recognize various alternative designs and embodiments for practicing the invention within the scope of the appended claims.

The invention claimed is:
1. A selectable one-way clutch comprising:
a generally annular race;

a generally annular cam disposed radially about said race, said cam having a radially internal surface defining a first plurality of tapered face portions and a second plurality of tapered face portions, wherein said cam defines a plurality of shoulder portions on said radially internal surface;

a first plurality of rollers disposed radially between said race and said cam; and a second plurality of rollers disposed radially between said race and said cam, said second plurality of rollers interposed respectively between said first plurality of rollers;

wherein said first plurality of rollers are selectively engageable with said first plurality of tapered face portions to substantially lock-up said selectable one-way clutch in a first direction, and said second plurality of rollers are selectively engageable with said second plurality of tapered face portions to substantially lock-up said selectable one-way clutch in a second direction; and wherein said plurality of shoulder portions are configured to limit translation of a respective one of said first and said second plurality of rollers relative to the cam.

2. The selectable one-way clutch of claim 1, further comprising an actuator selectively engageable with said first plurality of rollers such that said selectable one-way clutch overruns in the first direction, and selectively engageable with said second plurality of rollers such that said selectable one-way clutch overruns in the second direction.

3. The selectable one-way clutch of claim 2, wherein said actuator includes a plurality of fingers adapted to selectively engage said first plurality of rollers and said second plurality of rollers.

4. The selectable one-way clutch of claim 3, wherein said actuator is hydraulically controlled.

5. The selectable one-way clutch of claim 1, further comprising a plurality of springs disposed respectively between said first plurality of rollers and said second plurality of rollers, said plurality of springs configured to bias said first plurality of rollers into respective engagement with said first plurality of tapered face portions, and said second plurality of rollers into respective engagement with said second plurality of tapered face portions.

6. The selectable one-way clutch of claim 1, wherein said first plurality of rollers and said second plurality of rollers are generally cylindrical.

7. The selectable one-way clutch of claim 1, wherein said first plurality of rollers and said second plurality of rollers are generally spherical.

8. A selectable one-way clutch comprising:

a generally annular race;

a generally annular cam disposed radially about said race, said cam having a radially internal surface defining a first plurality of tapered face portions, a second plurality of tapered face portions, and a plurality of shoulder portions;

a first plurality of rollers disposed radially between said race and said cam; and a second plurality of rollers disposed radially between said race and said cam, said second plurality of rollers interposed respectively between said first plurality of rollers, wherein said first plurality of rollers are selectively engageable with said first plurality of tapered face portions to lock-up said selectable one-way clutch in a first direction, and said second plurality of rollers are selectively engageable with said second plurality of tapered face portions to lock-up said selectable one-way clutch in a second direction; and an actuator selectively engageable with said first plurality of rollers such that said selectable one-way clutch overruns in the first direction, and selectively engageable with said second plurality of rollers such that said selectable one-way clutch overruns in the second direction;

wherein said plurality of shoulder portions are configured to limit translation of a respective one of said first and said second plurality of rollers relative to said cam.

9. The selectable one-way clutch of claim 8, wherein said actuator includes a plurality of fingers adapted to selectively engage said first plurality of rollers and said second plurality of rollers.

10. The selectable one-way clutch of claim 9, wherein said actuator is hydraulically controlled between three positions; and wherein each of said plurality of fingers engages one of said first plurality of rollers when said actuator is hydraulically controlled to one of said three positions, and one of said second plurality of rollers when said actuator is hydraulically controlled to a second of said three positions.

11. The selectable one-way clutch of claim 10, further comprising a plurality of springs disposed respectively between said first plurality of rollers and said second plurality of rollers, said plurality of springs configured to bias said first plurality of rollers into engagement with said first plurality of tapered face portions, and said second plurality of rollers into engagement with said second plurality of tapered face portions.

12. The selectable one-way clutch of claim 11, wherein said first plurality of rollers and said second plurality of rollers are generally cylindrical.

13. The selectable one-way clutch of claim 11, wherein said first plurality of rollers and said second plurality of rollers are generally spherical.

14. A selectable one-way clutch comprising:

a generally annular race;

a generally annular cam disposed radially about said race, said cam having a radially internal surface defining a first plurality of tapered face portions, a second plurality of tapered face portions, and a plurality of shoulder portions;

a first plurality of rollers disposed radially between said race and said cam; and a second plurality of rollers disposed radially between said race and said cam, said second plurality of rollers interposed respectively between said first plurality of rollers, wherein said first plurality of rollers are selectively engageable with said first plurality of tapered face portions to lock-up said selectable one-way clutch in a first direction, and said second plurality of rollers are selectively engageable with said second plurality of tapered face portions to lock-up said selectable one-way clutch in a second direction, and wherein translation of each of said first and said second plurality of rollers is limited by a different one of said plurality of shoulder portions;

a plurality of springs disposed respectively between said first plurality of rollers and said second plurality of rollers, said plurality of springs configured to bias said first plurality of rollers into respective engagement with said first plurality of tapered face portions, and said second plurality of rollers into respective engagement with said second plurality of tapered face portions; and a generally annular actuator cage selectively engageable with each of said first plurality of rollers such that said selectable one-way clutch overruns in the first direction, and selectively engageable with each of said second plurality of rollers such that said selectable one-way clutch overruns in the second direction.

15. The selectable one-way clutch of claim 14, wherein said actuator cage includes a plurality of fingers each being adapted to selectively engage a different one of said first plurality of rollers when said actuator cage is moved in one direction and to selectively engage a different one of said second plurality of rollers when moved in another direction.

16. The selectable one-way clutch of claim 15, wherein said first plurality of rollers and said second plurality of rollers are generally cylindrical.

17. The selectable one-way clutch of claim 15, wherein said first plurality of rollers and said second plurality of rollers are generally spherical.

* * * * *